United States Patent
May et al.

[15] 3,692,081
[45] Sept. 19, 1972

[54] TRUING APPARATUS

[72] Inventors: George May, Lansing; Melvin H. Lill, Okemos, both of Mich.

[73] Assignee: FMC Corporation, San Jose, Calif.

[22] Filed: Oct. 22, 1970

[21] Appl. No.: 82,923

[52] U.S. Cl. ............................................. 157/13
[51] Int. Cl. ......................................... B29h 21/01
[58] Field of Search ....................................... 157/13

[56] References Cited

UNITED STATES PATENTS

| | | |
|---|---|---|
| 2,893,479 | 7/1959 | Sheridan et al. ............... 157/13 |
| 2,009,524 | 7/1935 | Schmidt ......................... 157/13 |
| 2,601,810 | 7/1952 | James ............................ 157/13 |
| 2,925,125 | 2/1960 | Curry ............................ 157/13 |
| 2,986,205 | 5/1961 | Okerstrom ..................... 157/13 |
| 3,003,545 | 10/1961 | Peacock ........................ 157/13 |
| 3,556,194 | 1/1971 | Farrington .................... 157/13 |

*Primary Examiner*—Granville Y. Custer, Jr.
*Attorney*—F. W. Anderson, C. E. Tripp and A. J. Moore

[57] ABSTRACT

A tire truing apparatus having a driven tire mounted for longitudinal movement toward and away from a motor driven cutter mounted for movement transversely of the tire along a preselected tread contour forming path. A transversely movable carriage has a cutter motor supporting plate that is pivotally connected to its forward end and is pivoted relative to the carriage by a cam and connecting linkages. A pair of radius rods have first ends pivoted to a frame and have their other ends pivotally connected at preselected positions in arcuate slots formed in the carriage having radii equal to that of the radius rods and transcribed about the axes of said first ends when the carriage is centered transversely. The arcuate extent of the slots is sufficient to allow the radius rods to be adjusted from a divergent position through parallel position and into a plurality of preselected convergent positions for guiding the cutter along preselected paths which will cut transverse contours on the tires, which contours vary from small to progressively larger radii convex curvatures, to a flat cut, and finally to concave curvatures.

26 Claims, 15 Drawing Figures

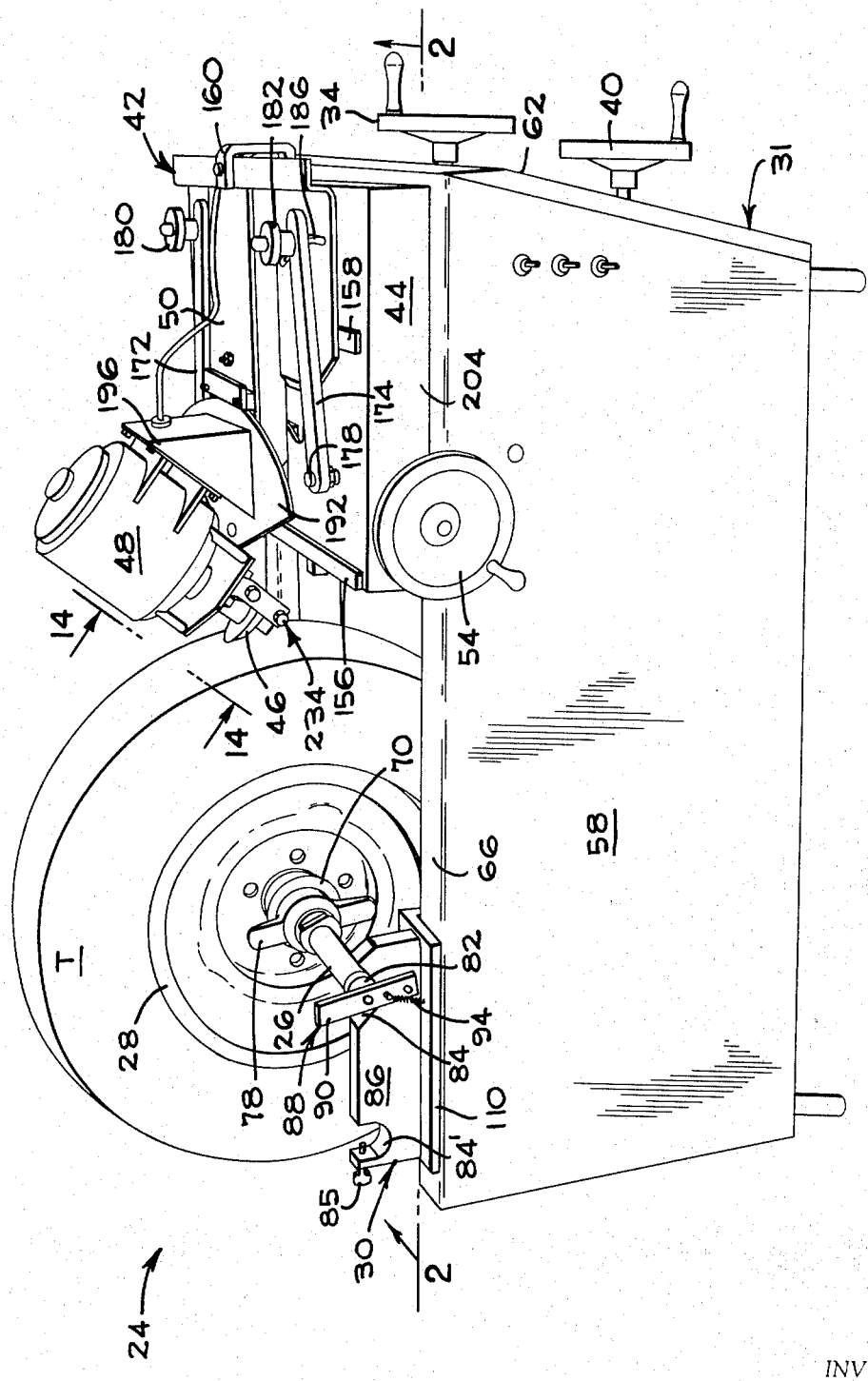

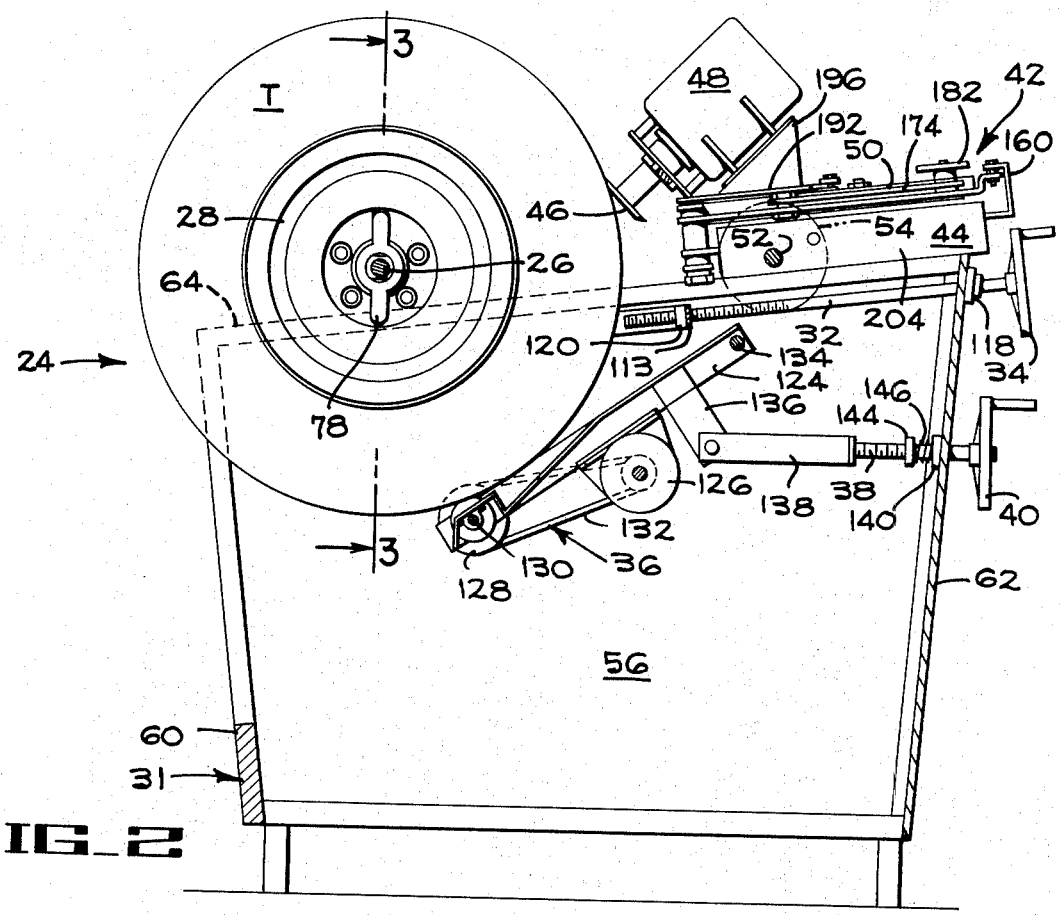
FIG_2
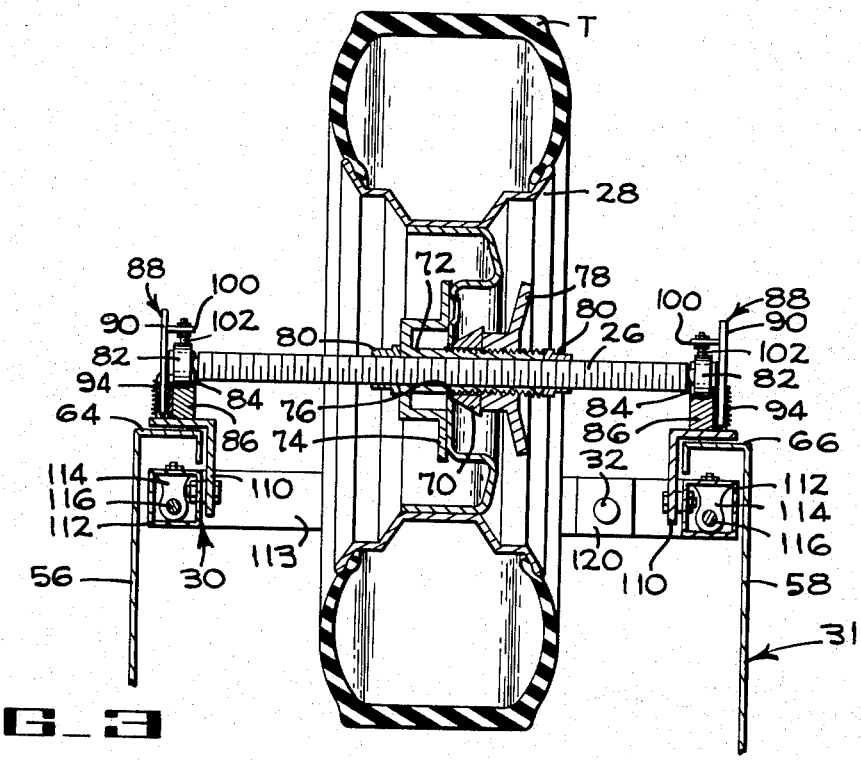
FIG_3

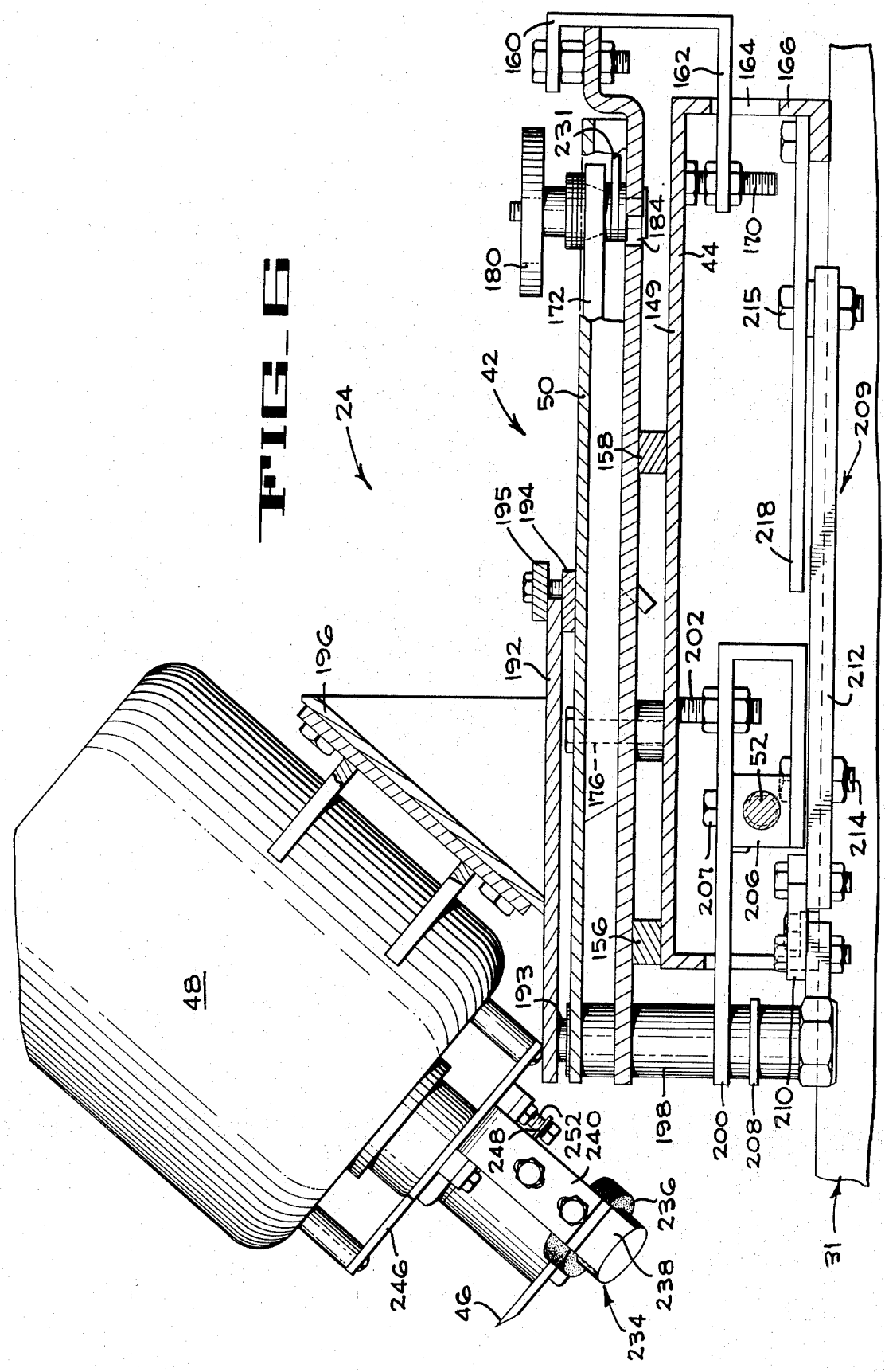

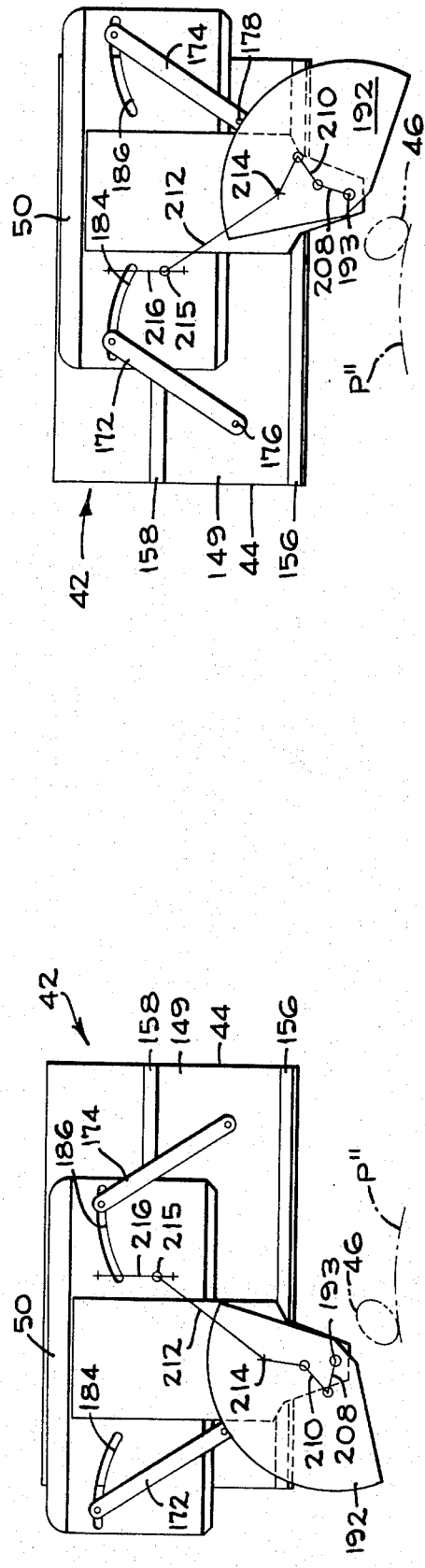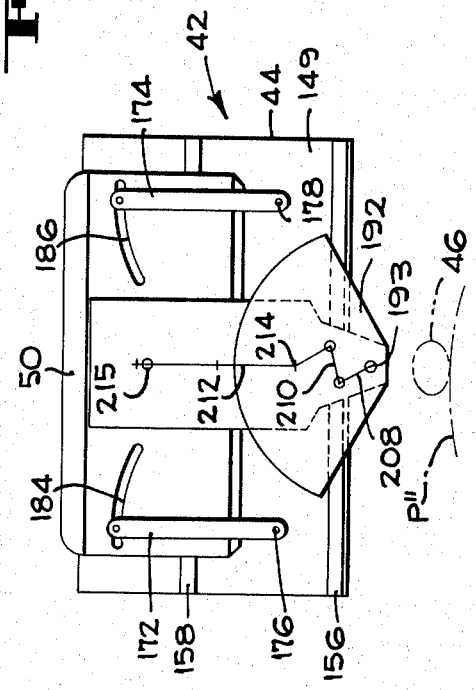

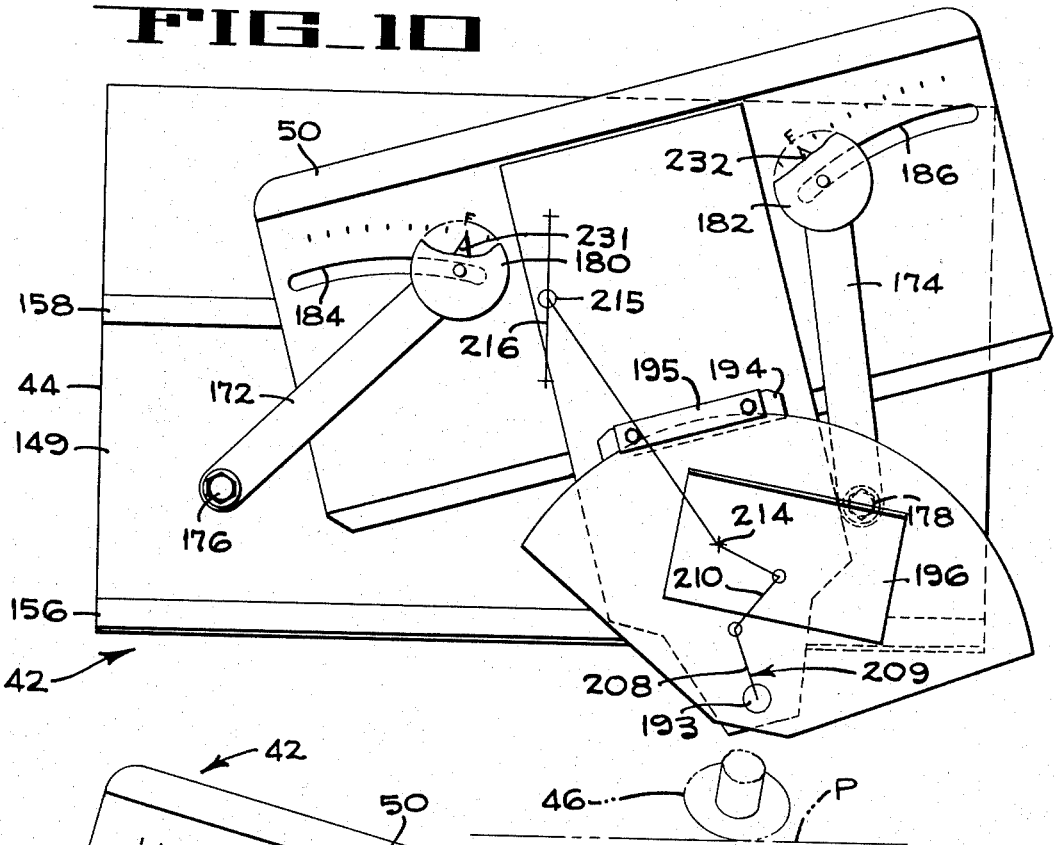
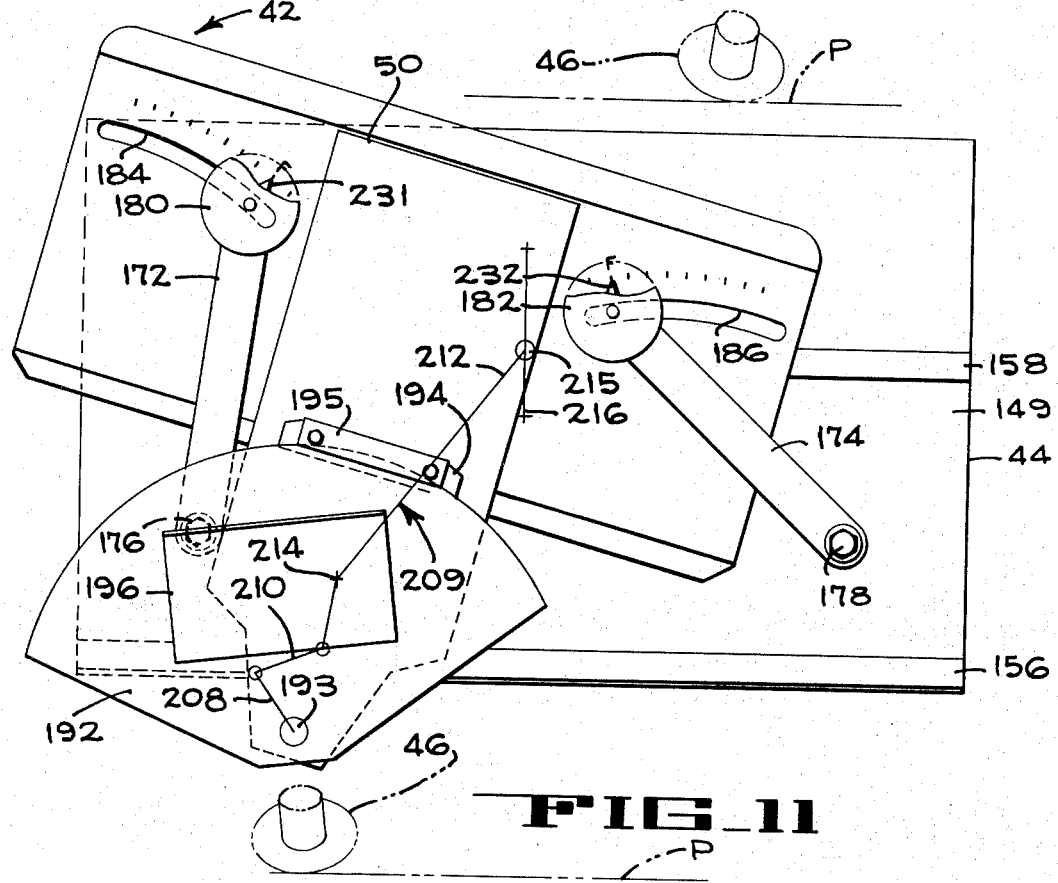

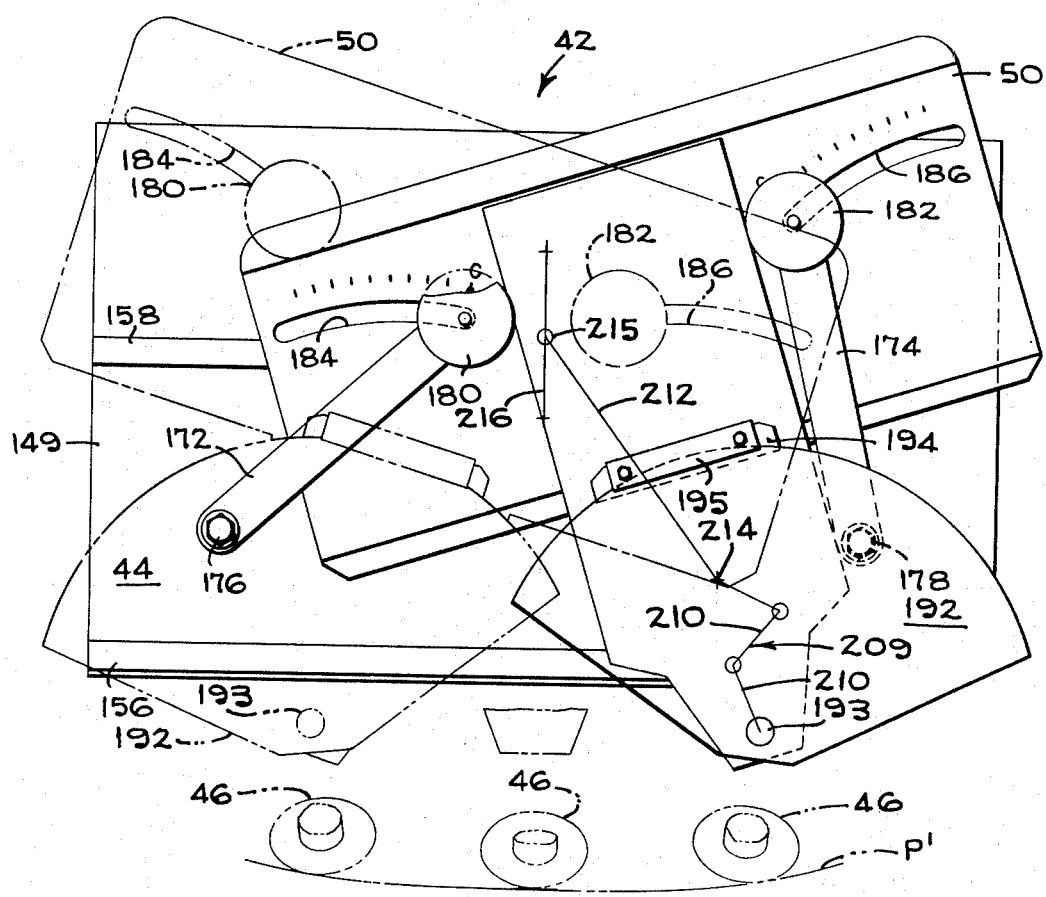
FIG_12
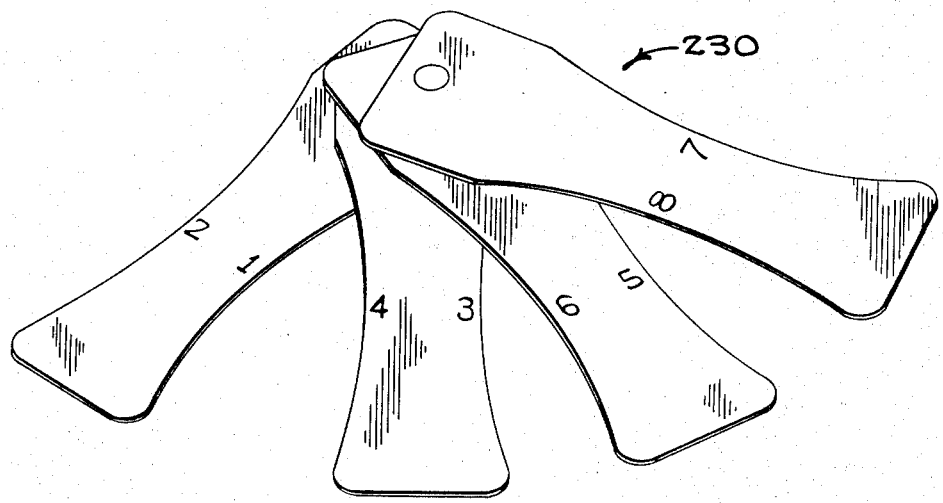
FIG_13

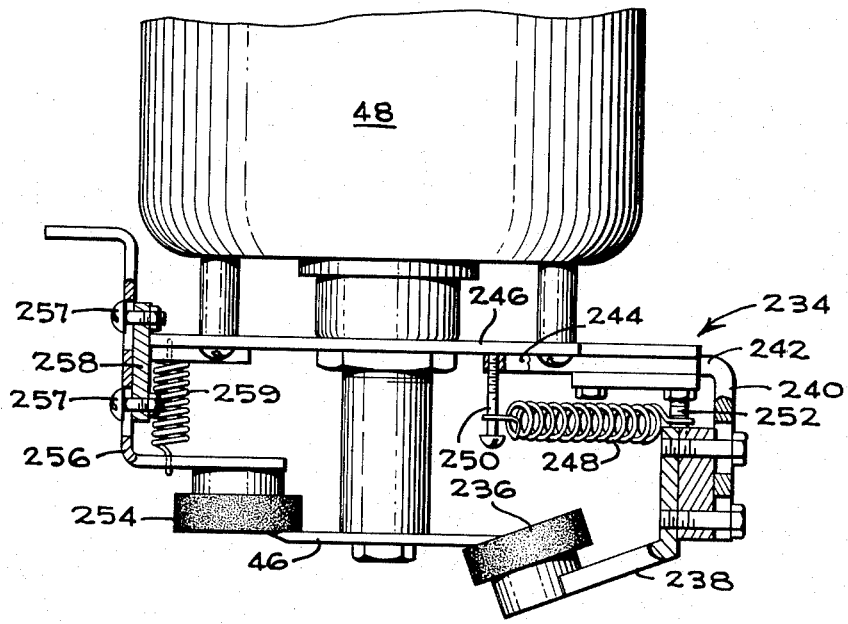
FIG_14
FIG_15
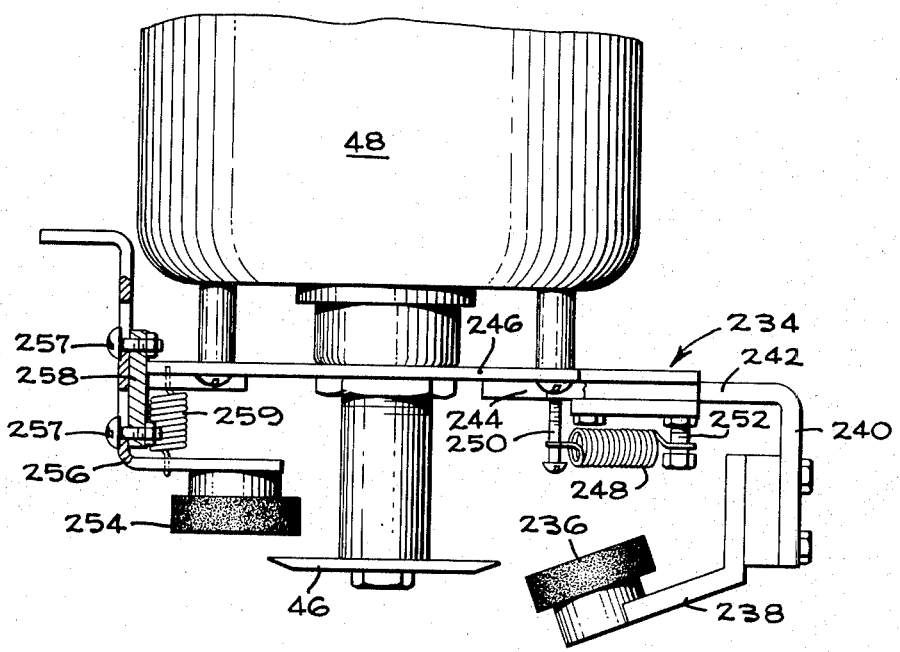

TRUING APPARATUS

BACKGROUND OF THE INVENTION

1. Field of the Invention

This invention pertains to the tire truing art and more particularly relates to an improved tire truing apparatus which is readily adjustable between a position which will cut a flat periphery on the tire and a plurality of positions which will cut different preselected convex or concave arcuate contours across the tire.

2. Description of the Prior Art

It is well known to provide different types of rotary cutters to trim the tread of a driven wheel mounted tire to remove the high spots therefrom and provide a truly round tire. Such a device is as disclosed in U.S. Pat. No. 3,003,545 which issued to Peacock on Oct. 10, 1961. The Peacock patent discloses a tire truing apparatus which includes longitudinally adjustable radius rods each having one end pivoted to a carriage that is movable toward or away from a tire that is located about a fixed axis and has its other end pivoted to a table that is movable with the carriage toward or away from the tire and is also movable transversely of the tire. The radius rods control the transverse movement of a motor driven cutter so that an arcuate convex contour is cut laterally across the periphery of the tire. The radius of the contour may be varied by varying the length of the radius rods.

SUMMARY OF THE INVENTION

The tire truing apparatus of the present invention provides a carrier for supporting a driven wheel and for moving the wheel toward or away from a motor mounted cutter by means of a hand wheel operated longitudinal adjustment screw. Radius rods of fixed length each have one end pivotally connected to a stationary sub-frame and have their other ends pivotally connected at selected positions in arcuate slots in a carriage that is moved transversely, under the control of the radius rods, by a hand wheel operated transverse adjustment screw. The motor mounted cutter is supported by a motor mounting plate that is pivoted to the carriage and is swung relative thereto by a linkage system connected to the sub-frame. The adjustable ends of the radius rods are pivotally connected in preselected positions in their associated arcuate slots so as to vary the contour of the tire according to desired contours indicated on templates which are numbered to correspond to similar numbers marked adjacent the periphery of the slots. The radius rods may be adjusted between a divergent position to provide a minimum radius convex cut on the periphery of the tire, to positions wherein the radius rods converge toward their adjustable ends a sufficient amount to progressively provide larger radii convex cuts, a flat cut, and upon further convergence to provide concave cuts on the tire.

An object of the invention is, therefore, to provide an improved tire truing apparatus which may be adjusted either to provide a flat cut or a plurality of concave or convex arcuate cuts of preselected radii.

Another object is to provide a tire truing apparatus wherein the tire is moved longitudinally relative to the cutter and wherein all tire truing hand wheels remain in the same location for operator convenience regardless of the diameter variations in tires being trued.

BRIEF DESCRIPTION OF THE DRAWINGS

FIG. 1 is a perspective of the tire truing apparatus of the present invention.

FIG. 2 is a vertical longitudinal section taken along lines 2—2 of FIG. 1 illustrating the mechanism for moving the tire longitudinally and the mechanism for driving the tire.

FIG. 3 is a vertical transverse section taken along lines 3—3 of FIG. 2 illustrating the manner of mounting the wheel on the spindle and the structure for moving the wheel longitudinally.

FIG. 6 is an enlarged vertical longitudinal central section taken substantially along lines 6—6 of FIG. 5 illustrating the cutter subassembly when the cutter is in its central position.

FIG. 7 is a diagrammatic operational plan view with the cutter motor removed illustrating the carriage at its far left position when the radius rods are located in an intermediate position in their connecting slots, i.e., in parallel positions, certain linkages being shown in center lines.

FIG. 8 is a diagrammatic operational view similar to FIG. 7 but showing the cutter at the midpoint of its transverse travel.

FIG. 9 is a diagrammatic operational view similar to FIG. 7 but showing the cutter at the right end of its stroke.

FIGS. 10 and 11 are diagrammatic operational views similar to FIGS. 9 and 7, respectively, illustrating the radius rods in a convergent position which will cause the cutter to move in a linear path to provide a flat cut across the tire.

FIG. 12 is a diagrammatic view similar to FIG. 9 but illustrating the radius rods in their most convergent position to move the cutter along a path which will provide a concave cut, the carriage being shown in solid lines in its right hand position and in phantom lines in its left hand position.

FIG. 13 is a diagrammatic perspective of a template having several tire contours formed thereon.

FIGS. 14 and 15 are enlarged views looking in the direction of arrows 14—14 of FIG. 1 showing the cutter dressing stones in their sharpening and inactive positions, respectively.

DESCRIPTION OF THE PREFERRED EMBODIMENT

Figure 5:
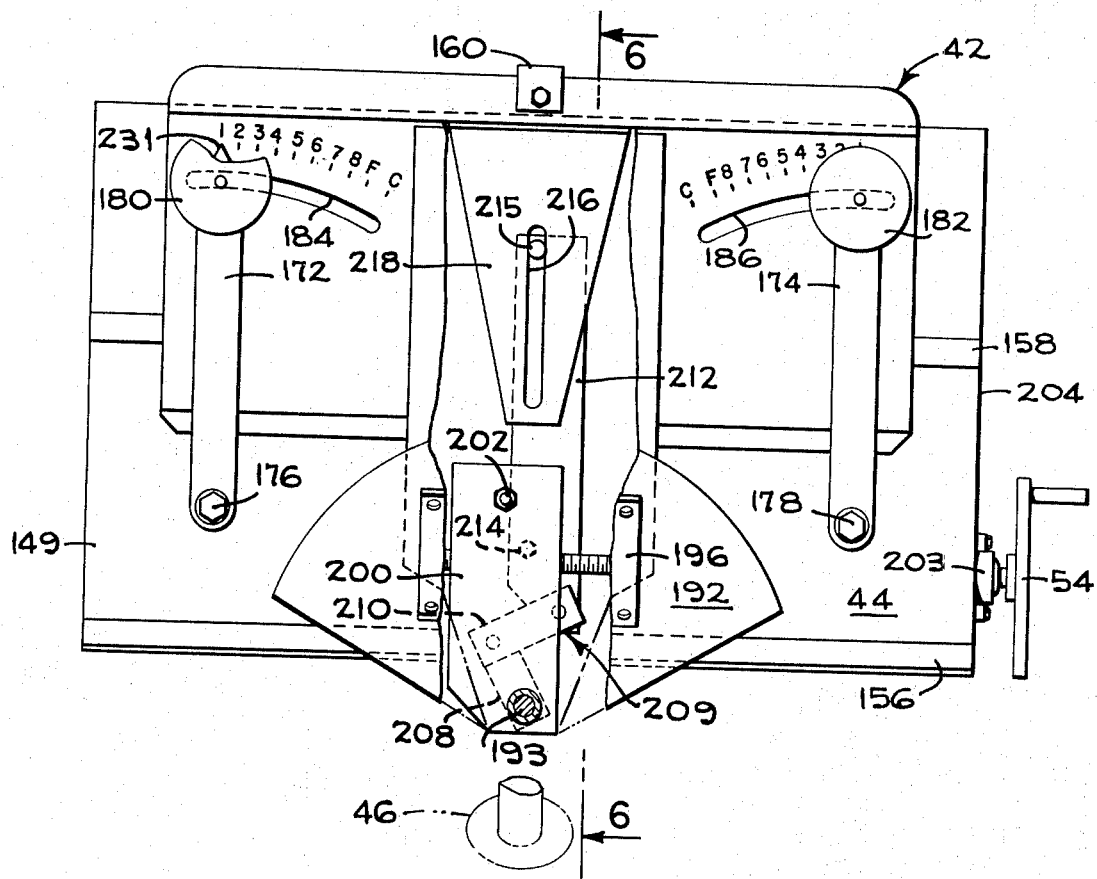
FIG. 5 is an enlarged plan illustrating the cutter subassembly, centered and with the radius rods in a parallel position, the cutter motor and certain other parts being cut away to illustrate a cutter controlling linkage system.

In general, the tire truing apparatus 24 (FIGS. 1 to 3) of the present invention comprises a spindle 26 which supports a wheel 28 and the tire T to be trued. The spindle is mounted on a carrier 30 which is moved longitudinally of a main frame 31 by a screw 32 (FIG. 2) operated by a hand wheel 34. The wheel 28 and tire T are driven by a drive mechanism 36 which is moved toward and away from the tire T by means of a screw 38 operated by a hand wheel 40. A unitary cutter assembly 42 (FIGS. 1, 2, 5 and 6) including a box-like sub-frame 44 is bolted in fixed position to the main frame. A cutter 46 is secured to the shaft of a motor 48 supported by a carriage 50 of generally T-shaped configuration that is movable transversely by a screw 52 operated by hand wheel 54.

More particularly, the main frame 31 of the tire truing apparatus 24 includes side walls 56 and 58 (FIGS. 1-3) connected by a transverse beam 60 at the lower front of the frame 31 and a closed rear wall 62. Upper frame members 64 and 66 of the side walls 56 and 58, respectively, are inclined forwardly and downwardly to reduce the height that the operator must lift the relatively heavy tires being trued. The transverse beam 60 defines a front wall which is perpendicular to the upper frame members 64 and 66 to provide foot room for the operator when he is mounting the tire on the apparatus. The rear wall is likewise inclined downwardly and forwardly for the convenience of the operator.

As best shown in FIGS. 2 and 3, the tire T and wheel 28 are mounted on the spindle 26 by a conical wedge 70 which is slidable on a sleeve 72 formed integrally with a recessed flange 74. The conical wedge 70 enters the wheel bore 76 and is forced into the bore by a wing nut 78 screwed on the sleeve 72 thus centering the wheel on the sleeve and forcing the wheel firmly against the flange 74. The wheel 28 is then axially centered on the threaded spindle by a pair of cooperating nuts 80.

Figure 4:
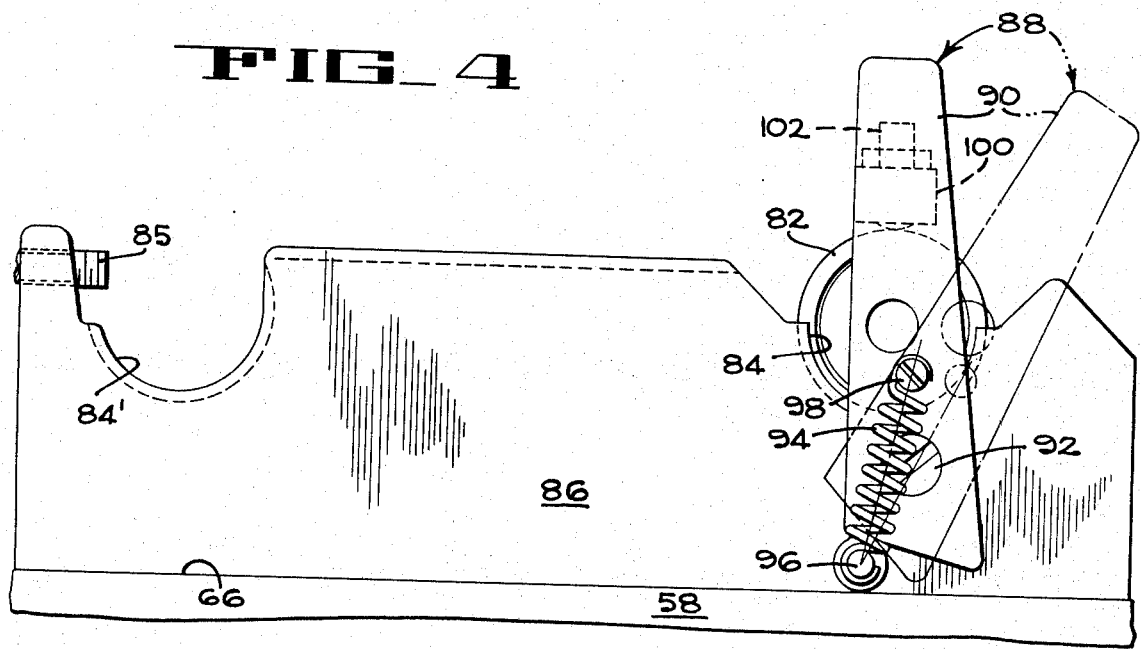
FIG. 4 is a side view illustrating an overcenter lock for maintaining the spindle in its support.

The spindle has anti-friction bearings 82 on its ends which are received in transversely aligned sets of U-shaped slots 84 and 84' (FIG. 4) formed in spindle mounting blocks 86 which form a part of the longitudinally movable tire supporting carrier 30. The two sets of slots 84 and 84' are provided to accommodate tires which vary considerably in outside diameters, the subject apparatus being capable of handling tires having outside diameters which lie within the range of 18 inches to 46 inches.

In order to rapidly and positively lock the spindle 26 in its supporting slots, an overcenter lock 88 (FIGS. 3 and 4) is associated with each slot 84. Although the overcenter locks 88 may also be used in conjunction with the slots 84', it has been found that a great majority of tires T to be trued are of a size which will require mounting in the slots 84 for truing. Accordingly, thumb screws 85 are provided to lock the spindle in the slots 84' when truck tires are being trued.

Each overcenter lock comprises a pivot arm 90 (FIG. 4) that is pivoted adjacent its lower end on a cap screw 92, and which is provided with a beveled lower end. A spring 94 is connected between a pin 96 secured to the associated block 86 below the pivot point of the arm 90 and to a screw 98 in the arm above the pivot point. The pin 96 also serves to limit the pivotal movement of the pivot arm 90 by being positioned to engage the inclined end of the arm. An ear 100 having a stud 102 threaded therein and locked in place is welded to the upper portion of the pivot arm 90 and projects outwardly over the associated slot when the arm is pivoted into its locking position. When the arm is in the locking position, the stud 102 will be disposed immediately above and will prevent displacement of the spindle bearing 82 from the associated slot 84. At this time, the center line of the spring 94 will be disposed on one side of the pivot point 92 as illustrated in solid lines (FIG. 4) and will lock the arm in place until manually moved to the open position. When in the open position, the center line of the spring will be disposed on the other side of the pivot axis and will lock the pivot arm in the open position as indicated in dotted lines.

The tire supporting carrier (FIGS. 2 and 3) comprises the aforementioned spindle mounting blocks 86 each of which is mounted on an angle bar 110 rigid with an elongated box member 112. The box members 112 are connected at their rear ends to a transversely extending angle bar 113. Bearing blocks 114 are secured to the box members 112 near each end and are slidably received on the rods 116 which are bolted to upstanding frame members of the side walls 56 and 58 of the frame 31. The rods 116 are disposed parallel to and immediately below the associated upper frame members 64 and 66. Thus, the rods 116 extend the full length of the frame 31 and are preferably rigidly secured to the frame 31 by capscrews (not shown) screwed in threaded holes in the ends of the rods 116, and extend through associated holes in the forward and rear edges of side walls 56 and 58 of the frame 31.

The previously mentioned screw 32 and hand wheel 34 are operated to adjust the carrier longitudinally through a stroke of about nine inches. As illustrated in FIG. 3, the screw 32 is disposed between and is parallel to the rods 116. The screw 32 is journaled in an adapter 118 (FIG. 2) that permits rotation but not axial movement of the screw 32 and which is secured to the rear wall 62 of the frame. A threaded block 120 is bolted to the transverse angle bar 113 and receives the screw 32. Thus, rotation of the screw 32 by means of the hand wheel 34 will cause the tire supporting carrier 30 and tire T to move longitudinally of the frame.

The tire T is driven during the truing operation by the drive mechanism 36 which is best shown in FIG. 2. The mechanism 36 includes an inclined table 124 which carries a motor 126 and a knurled tire engaging roller 128 that is keyed to a shaft 130 journaled in the table 124. The shaft 130 is connected to the motor shaft by a belt drive 132.

In order to accommodate tires of different sizes, the table 124 is connected to a shaft 134 which is pivotally connected to the side walls of the frame 31. A lever 136 which is rigidly secured to the table 124 projects downwardly and is pivotally connected to a linkage 138 which threadedly receives the adjustment screw 38. The screw is actuated by the previously mentioned hand wheel 40 and is journaled for rotation and for a limited amount of axial movement in a bearing 140 secured to the rear wall 62. As indicated in FIG. 2, the screw 38 has a collar 144 thereon which is urged to the left by a compression spring 146 disposed between the collar and the bearing 140. Thus, the hand wheel 40 may be operated to move the knurled roller into firm driving engagement against the tire T, and the spring 146 will compensate both for the unevenness in the periphery of the tire and for the longitudinal movement of the tire toward the cutter 46 as required to trim off enough of the tread to assure that the periphery of the trued tire is perfectly round.

As mentioned previously, the unitary cutter assembly 42 includes the box-like sub-frame 44 which is bolted to the main frame 31 and supports the cutter 46 and all of the transverse adjustment and contour controlling mechanisms thereon as a unit. As best shown in FIGS. 5 and 6, a pair of transversely extending slide bars 156 and 158 are rigidly secured to the upper surface of the sub-frame 44 and slidably supports the generally T-shaped carriage 50. The forward end of the carriage 50 supports the weight of the motor 48 and projects over the forward edge of the sub-frame 44. For the purpose of preventing upward tilting of the rear end of the carriage, a U-shaped bracket 160 is bolted to the upper surface of the carriage and includes an arm 162 which projects through a slot 164 in the rear wall 166 of the sub-frame 44. A screw 170 is threaded into the arm 162 and is locked in place by a lock nut with the free end of the screw in sliding engagement with the lower surface of the sub-frame's upper wall 149 thus preventing tilting of the carriage.

A pair of angularly adjustable radius rods 172 and 174 of fixed length have their forward ends pivotally connected by pivot bolts 176 and 178, respectively, to the sub-frame 44, and have their rear ends pivotally connected by clamping screws 180 and 182, respectively, to arcuate connecting means in the form of slots 184 and 186, respectively. As best shown in FIG. 6, the arcuate slots 184 and 186 are transcribed about the pivot axes of their respective radius rod pivot bolts 176 and 178, respectively. The arcuate slots 184 and 186 allow the radius rods to be clamped in parallel positions, as illustrated in FIGS. 5 and 7 to 9, in divergent positions when at the outer ends of the slots, or in a plurality of converging positions (FIGS. 10–12) wherein the radius rods converge toward the rear of the apparatus. Thus, the arcuate slots 184 and 186 permit angular adjustment of the radius rods 172 and 174 with the result that the contour cut on the periphery of the tire may be varied considerably as will be described in more detail later. It will also be noted that when the carriage 50 is centered transversely of the truing apparatus, that the radius rods may be adjusted to any of their positions without moving the cutter forwardly or rearwardly. Thus, a tire T may be placed in truing or trimming position longitudinally relative to the cutter, and radius rods may then be adjusted to define anyone of a plurality of different contoured cuts across the tire without requiring that the tire be repositioned longitudinally.

A motor mounting plate 192 is pivotally supported on the forward end of the carriage 50 by a pivot pin 193 welded thereto and by a slide bar 194 welded to the upper surface of the carriage. The rear edge of the plate 192 is formed as an arc and projects under a hold down bar 195 which is secured to the carriage by cap screws and cooperating spacer blocks (not shown). The motor 48 is bolted to an inclined wall of a motor mounting bracket 196 that is welded to the motor mounting plate 192 so that the cutter 46 will be repositioned forwardly of the leading edge of the plate 192 and carriage 50.

The pivot pin 193 is received for pivotal movement in the carriage 50, and in a collar 198 and U-shaped arm 200 which are rigidly connected to the carriage 50. The arm 200 projects rearwardly under the upper wall 149 of the sub-frame 44 and has a capscrew 202 threaded through the arm 200 and locked in place to slidably engage the undersurface of the sub-frame wall 149 to prevent raising of the forward end of the carriage 50 and motor mounting plate 192. In order to move the carriage transversely, the aforementioned transverse adjustment screw 52 is rotatably received in and held from axial movement relative to a self-aligning bearing 203 (FIG. 5) bolted to a side wall 204 of the sub-frame 44. The screw 52 is threaded into a block 206 (FIG. 6) that is pivotally connected to the arm 200 by conically tipped shouldered capscrew or the like 207. Thus, rotation of the hand wheel 54 will cause the carriage 50 to translate, or translate and partially rotate, relative to the sub-frame 44, depending upon the angular setting of the radius rods 172 and 174. If the radius rods are parallel, pure translatory movement will result when the screw 54 moves the carriage transversely from one end of its stroke to the other as indicated in FIGS. 7–9. If the radius rods are in any of their converging positions, or diverging positions a rotary component will be added to the translatory movement as indicated in FIGS. 10–12.

In addition to the translatory movement of the carriage relative to the frame, rotation of the screw 52 also causes the motor mounting plate 192 and motor to pivot through predetermined arcuate ranges relative to the longitudinal axis of the carriage 50 depending upon the positions of the radius rods 172 and 174. In order to accomplish this pivotal motion of the motor mounting plate 192, a short lever 208 of a linkage system 209 (FIGS. 5 and 6) is rigidly secured to the pivot pin 193 and is pivotally connected by a link 210 to one end of an actuating lever 212. The actuating lever 212 is pivotally mounted by a cap screw 214 to the U-shaped arm 200. The lever 212 has a bolt 215 secured thereto which is slidably received in a longitudinally extending slot 216 that is formed in a generally V-shaped bracket 218 rigidly secured to the sub-frame 44. Although the slot 216 is illustrated as being a linear slot, it will be understood that the slot may be slightly curved to more accurately control the cutting action.

As will be apparent from FIGS. 5 and 7 to 9, actuation of the hand wheel 54 to move the carriage 50 transversely causes the bolt 215 to move longitudinally in the slot 216 causing the motor mounting plate 192 to move in an arcuate path as indicated. In this way, the axis of rotation of the cutter 46 is directed toward the axis of generation of the preselected contour being cut on the tire T.

In order to aid the operator and to readily indicate to a customer what contour is to be cut on the tire T, the operator is provided with a template 230 (FIG. 13) having eight convex tire contours formed thereon and identified by numerals 1 to 8, or similar indicia, which identifies convex curvatures of progressively increasing radii. As indicated in FIG. 5, these same numerals plus the letter "F" for "flat" and "C" for "concave" are marked along the periphery of each arcuate slot 184 and 186. Thus, when the operator locks pointers 231 and 232 (FIGS. 5, 10 and 11) and the adjustable ends of the radius rods 172 and 174 opposite one of the numerals, for example numeral 2, after the truing operation has been completed the periphery of the tire T will assume the convex profile opposite numeral 2 on the template 230. If the operator locks the free ends of the radius rods adjacent the mark "F" the cutter will move along a linear path P to trim the tire so that the tread is flat as illustrated in FIGS. 10 and 11.

If the operator locks the free ends of the radius rods to the innermost ends of the slots, i.e., placing the radius rods in their most convergent positions, the cutter will trim the tire so that the tire tread is concave as illustrated in FIG. 12 by the path P'. Concave tire treads may be desirable for very wide tires.

It will be apparent that in order to cleanly cut rubber from the tire to true the tire that the cutter 46 must be sharp at all times. Accordingly, a cutter sharpening device 234 is provided and includes a first dressing stone 236 that is journaled on a first L-shaped bracket 238 which is bolted to a second L-shaped bracket 240. The second bracket has a horizontal arm 242 which is slidably received in a way 244 mounted on a support plate 246 secured to the housing of the motor 48. A tension spring 248 is connected between a pin 250 secured to the inner end of the arm 242 and a capscrew 252 secured to the plate 246 and urges the first dressing stone 236 away from he cutter 46.

A second dressing stone 254 is provided to remove the burr caused by the first dressing stone 236. The second stone is journaled on a slotted Z-shaped bracket 236. The second A pair of screws 257 extend through the slots in the Z-shaped bracket 256 and are screwed into a bar 258 that is parallel to the motor shaft and is rigidly secured to the support plate 246. A tension spring 259 is connected between the Z-shaped bracket 256 and the plate 246 and normally urges the bracket upwardly.

Thus, when the operator wishes to sharpen the cutter, he merely pushes the first dressing stone 236 horizontally inward into engagement with the cutter against the tension of the spring 248. At the same time, the operator pushes the second dressing stone 254 downwardly against the flat back of the cutter to remove burrs and assure that the blade is properly sharpened.

In operation of the tire truing apparatus 24, the operator locks a wheel 28 (FIG. 1) and the inflated tire T to be trued on the sleeve 72 (FIG. 3) by means of the conical wedge 70 and wing nut 78. The spindle 26 upon which the sleeve 72 is mounted is then placed in the appropriate slots 84 or 84' (FIG. 1), depending upon the diameter of the tire T, and is locked in place by the associated overcenter locks 88 or thumb screws 85. The tire T is then transversely centered on the spindle 26, which centering operation may be aided by a slide plate (not shown) having a V-shaped notch therein in a manner well known in the art. The tire T is then locked in place on the spindle 26 by the locknuts 80.

With the tire mounted on the spindle as above described and with the cutter 46 centered transversely, the operator actuates the hand wheel 34 (FIG. 2) to move the carrier 30 and tire T to a position wherein the cutter 46 will engage and take a thin cut off the high spots on the tire T. The wheel drive mechanism 36 is then moved by means of the screw 38 and hand wheel 40 so that the knurled roller 128 is in firm engagement with the tire T and so that the spring 146 will allow the carrier 30 and tire T to be moved a short distance toward the cutter during the trimming operation to cut as much rubber from the tire as is required to true the tire without making additional adjustments to the drive mechanism 36.

At this time, or if desired prior to any or all of the above mentioned operations, the operator determines with the aid of the template 230 (FIG. 13) what contour is to be cut on the periphery of the tire and sets the radius rods 172 and 174 accordingly. For example, if the operator determines that a relatively small radius cut is desired such as a number 2 cut wherein the radius rods are parallel, the operator would then lock the adjustable ends of the radius rods 172 and 174 in the positions indicated in FIGS. 7–9 near the outer ends of the arcuate slots by tightening the clamping screws 180 and 182 in those positions. The so adjusted radius rods 172 and 174 and the linkage system 209 then cooperate, upon actuation of the transverse screw 52, to move the cutter along a path P'' as illustrated in FIGS. 7, 8 and 9, thereby providing a convex contour on the periphery of the tire.

If a flat cut is desired, the operator moves the radius rods to a convergent position opposite the mark "F" (FIGS. 10 and 11) and tighten the clamping screws 180 and 182 when in this position. Actuation of the transverse adjustment screw would then cause the radius rods and linkage system 209 to control the movement of the cutter 46, carriage 50 and motor mounting plate 192 to move as indicated in FIGS. 10 and 11. If a concave cut is desired, the radius rods are positioned as indicated in FIG. 12 with the result that actuation of the transverse screw 52 would cause the cutter to move along a concave path P' as illustrated in FIG. 12.

With the radius rods 172 and 174 attached in any one of the above described preselected positions, the operator moves the cutter 46 transversely to one side of the tire T by actuation of the hand wheel 54. If needed, the operator then sharpens the cutter 46 by momentarily moving the dressing stones 236 and 254 (FIGS. 14 and 15) against the cutter until sharp. The operator then starts the tire driving motor 126 (FIG. 2) which drives the tire in a clockwise direction as viewed in FIG. 1. The hand wheel 54 (FIG. 1) is then actuated to gradually move the cutter 46 transversely across the tire in its preset contour determining path thereby removing the high spots from the tire. The longitudinal adjustment screw 32 is then operated by the hand wheel 34 to move the tire T a short distance toward the cutter 46 so that a second cut can be made in response to the operator again actuating the hand wheel 54 to move the cutter transversely across the tire T. This action is repeated until the tire has been trued and the desired contour has been formed thereon.

From the foregoing description it is apparent that the improved tire truing apparatus of the present invention features a cutter which is controlled by a pair of angularly adjustable radius rods which may be readily adjusted so as to provide a flat cut across a tire or to provide either convex or concave arcuate contours of preselected curvature across the tire without requiring that the apparatus be designed to accommodate substantial longitudinal adjustment of the tire relative to the cutter to achieve this range of contours. The apparatus also features a carrier which moves the tire longitudinally relative to the cutter thereby permitting the hand wheels which control longitudinal movement of the tire and transverse movement of the cutter to be located at the same point relative to the frame at all times for the convenience of the operator. The apparatus also includes cutter dressing stones which are arranged to contact and sharpen the cutter from both sides.

Although the preferred embodiment of the apparatus has been described as a tire truing apparatus using a rotary cutter, it will be understood that other generally cylindrical articles may be trued with other types of cutters. For example, the article being trued may be a grinding wheel and the cutter may be a diamond cutting tool. It is also apparent that the term cutter appearing in the specification and claims is to be interpreted broadly enough to cover a grinding wheel or the like which removes material from the article being trued.

Although the best mode contemplated for carrying out the present invention has been herein shown and described, it will be apparent that modification and variation may be made without departing from what is regarded to be the subject matter of the invention.

What we claim is:

1. A truing apparatus comprising means for supporting a generally cylindrical article to be trued, means for rotating the article, a cutter, cutter supporting means for supporting the cutter for transverse movement across the periphery of the article, non-resilient adjustable control means for controlling the path of movement of said cutter supporting means along any one of a plurality of preselected paths within the range including a relatively small radius convex trimming cut through a flat cut to a large radius concave cut across the article, and transverse adjustment means operable for moving the cutter transversely along said preselected path to cut the desired contour on the periphery of the article, said non-resilient control means when adjusted into one of its preselected paths being operable to positively guide said cutter supporting means along said preselected path thereby minimizing chatter of the cutter when trimming the article.

2. A truing apparatus comprising means for supporting a generally cylindrical article to be trued, means for rotating the article, a cutter, cutter supporting means for supporting the cutter for transverse movement across the periphery of the article, adjustable control means for controlling the path of movement of said cutter supporting means along any one of a plurality of preselected paths within the range including a relatively small radius convex trimming cut through a flat cut to a large radius concave cut across the article, transverse adjustment means operable for moving the cutter transversely along said preselected path to cut the desired contour on the periphery of the article, said adjustable control means being selectively adjusted into any one of said positions without moving said cutter longitudinally when said cutter supporting means is positioned at a point which centers the cutter transversely of the article, and means for moving the article longitudinally into position to be trimmed.

3. A truing apparatus comprising mean for supporting a generally cylindrical article to be trued, means for rotating the article, a cutter, cutter supporting means for supporting the cutter for transverse movement across the periphery of the article, adjustable control means for controlling the path of movement of said cutter supporting means along any one of a plurality of preselected paths within the range including a relatively small radius convex trimming cut through a flat cut to a large radius concave cut across the article, transverse adjustment means operable for moving the cutter transversely along said preselected path to cut the desired contour on the periphery of the article, transverse movement of said cutter along every one of said preselected paths being operable to position the cutter at the same point when the cutter is at the transverse mid-point of its path of travel.

4. A truing apparatus comprising means for supporting a generally cylindrical article to be trued; means for rotating the article; a cutter; cutter supporting means for supporting the cutter for transverse movement across the periphery of the article; adjustable control means for controlling the path of movement of said cutter supporting means along any one of a plurality of preselected paths within the range including a relatively small radius convex trimming cut through a flat cut to a large radius concave cut across the article; transverse adjustment means operable for moving the cutter transversely along said preselected path to cut the desired contour on the periphery of the article; said article supporting means including spindle mounting blocks having U-shaped slots therein, a spindle having end portions removably mounted in said U-shaped slots, means for clamping the article in axial alignment on said spindle and at its transverse midpoint, and an overcenter lock associated with said slots and each overcenter lock being movable between an open position spaced from the associated slot for allowing one end of the spindle to be placed in the slot in a closed position over said slots for locking said one end of the spindle in the slot.

5. A truing apparatus comprising means for supporting a generally cylindrical article to be trued; means for rotating the article; a cutter; cutter supporting means for supporting the cutter for transverse movement across the periphery of the article; adjustable control means for controlling the path of movement of said cutter supporting means along any one of a plurality of preselected paths within the range including a relatively small radius convex trimming cut through a flat cut to a large radius concave cut across the article; transverse adjustment means operable for moving the cutter transversely along said preselected path to cut the desired contour on the periphery of the article; said article supporting means and said cutter supporting means being mounted on a stationary frame; said cutter supporting means comprising a carriage having means defining a pair of arcuate connecting means thereon, and a cutter mounting plate pivoted to said carriage at a point adjacent the trimming position; said adjustable control means including a pair of angularly adjustable radius rods with a first end of each rod pivotally connected to said frame and a second end of each rod pivotally connected at any one of a plurality of preselected positions to an associated one of said arcuate connecting means for controlling the movement of said cutter along a predetermined path as determined by said preselected portion of said second ends of each radius rod.

6. A truing apparatus according to claim 5 wherein said means defining said arcuate connecting means are generated about the pivot axes of said first ends of said associated radius rods when said carriage is centered transversely of the frame so that said second ends of the radius rods may be adjusted from positions wherein the radius rods diverge toward their adjustable ends to positions wherein the rods converge toward their adjustable ends without longitudinally changing the position of said cutter.

7. A truing apparatus comprising means for supporting a generally cylindrical article to be trued, means for rotating the article, a cutter, cutter supporting means for supporting the cutter for transverse movement across the periphery of the article, adjustable control means for controlling the path of movement of said cutter supporting means along any one of a plurality of preselected paths within the range including a relatively small radius convex trimming cut through a flat cut to a large radius concave cut across the article, transverse adjustment means operable for moving the cutter transversely along said preselected path to cut the desired contour on the periphery of the article, said adjustable control means including a pair of radius rods each having one end pivoted about fixed pivot axes and having their other ends pivotally connected to said cutter supporting means at any one of a plurality of preselected positions between positions wherein said radius rods diverge toward their adjustable ends to positions wherein said radius rods converge toward said other ends when said cutter supporting means is at its transverse midpoint.

8. A truing apparatus according to claim 6 wherein said arcuate connecting means includes means defining arcuate slots formed in said carriage.

9. A truing apparatus comprising means for supporting a generally cylindrical article to be trued; means for rotating the article; a cutter; cutter supporting means for supporting the cutter for transverse movement across the periphery of the article; adjustable control means for controlling the path of movement of said cutter supporting means along any one of a plurality of preselected paths within the range including a relatively small radius convex trimming cut through a flat cut to a large radius concave cut across the article; transverse adjustment means operable for moving the cutter transversely along said preselected path to cut the desired contour on the periphery of the article; said cutter being a driven rotary cutter; and a sharpening device which comprises a first dressing stone, first means mounting said first stone for movement toward and away from said cutter in a plane normal to the axis of rotation of said cutter for grinding a bevel on the periphery of said cutter, a second dressing stone, and second means for mounting said second stone for movement toward and away from said cutter in a plane parallel to the axis of rotation of said cutter.

10. A truing apparatus for truing an article comprising a frame, a carrier mounted on said frame for longitudinal movement relative thereto, article mounting means rotatably supporting a generally cylindrical article on said carrier, means for rotating the article, carriage means supported by said frame and including means defining a pair of arcuate connecting means, a pair of radius rods with each radius rod having a first end pivoted to said frame and an adjustable end pivotally secured at preselected positions to an associated one of said arcuate connecting means, a cutter supported by said carriage, longitudinal adjustment means for moving the carrier and article longitudinally of the frame and for locking the rotating article in position to be trimmed by said cutter, and transverse adjustment means for moving the cutter across the periphery of the rotating article for cutting sufficient material therefrom to provide a circular periphery on the article.

11. A truing apparatus according to claim 10 wherein said frame is inclined downwardly toward the article supporting end to reduce the height to which the article must be raised before being disposed in position to be supported by said article mounting means.

12. A truing apparatus according to claim 10 wherein said article mounting means includes spindle mounting blocks having U-shaped slots therein, a spindle having end portions removably mounted in said U-shaped slots, means for clamping the article in axial alignment on said spindle and for centering the article transversely thereof, and an overcenter lock associated with each of said slots, each overcenter lock being movable between an open position spaced from the associated slot for allowing an end of the spindle to be placed in the slot and a closed position over said slot locking said associated end of the spindle in the slot.

13. A truing apparatus according to claim 10 wherein said cutter is a rotary cutter.

14. A truing apparatus according to claim 10 wherein said arcuate connecting means are means defining arcuate slots.

15. A truing apparatus according to claim 10 and additionally comprising a cutter mounting plate, means pivotally mounting said plate on said carriage for pivotal movement about a point adjacent the article, said cutter being supported by said plate, said transverse adjustment means including control means for moving said carriage transversely of said frame, and linkage means extending between said cutter mounting plate and said frame to maintain said cutter axis substantially normal to the contour being cut on the article as said carriage is moved transversely of said frame.

16. A truing apparatus according to claim 15 wherein said means defining said arcuate connecting means are generated about the pivot axes of said first ends of said associated radius rods when said carriage is centered transversely of the frame so that the adjustable ends of the radius rods may be adjusted from positions wherein the radius rods are parallel to positions wherein the rods converge toward their adjustable ends without longitudinally changing the position of said cutter.

17. A truing apparatus according to claim 16 wherein said adjustable ends of said radius rods may be selectively adjusted through an arcuate range which will result in trimming cuts across the article that vary progressively from relatively small radii contours to a flat contour upon movement of the cutter across the article.

18. A truing apparatus according to claim 17 wherein selective positioning of the adjustable ends of the radius rods in their most convergent positions will result in a concave cut across the periphery of the article upon movement of the cutter transversely across the article.

19. A truing apparatus according to claim 13 and additionally comprising a sharpening device which comprises a first dressing stone, first means mounting said first stone for movement toward and away from said cutter in a plane normal to the axis of rotation of said cutter for grinding a bevel on the periphery of said cutter, a second dressing stone, second means mounting said second stone for movement toward and away from said cutter in a plane parallel to the axis of rotation of said cutter, and resilient means normally urging said stones away from said cutter.

20. A method of truing an article with a cutter supported on transversely movable cutter supporting means pivotally attached to a pair of angularly adjustable radius rods, comprising the steps of supporting an article to be trued, moving the article longitudinally into position to be trued, rotating the article, adjusting the cutter supporting means for controlling movement of the cutter along any one of a plurality of preselected paths which lie within the range which includes a relatively small radius convex cutting path to a flat cutting path across the article by varying the angle of the radius rods from a parallel position to different preselected degrees of convergent positions, and moving the cutter transversely along said preselected path to cut the desired contour on the periphery of the article.

21. A method of truing an article with a cutter supported on transversely movable cutter supporting means, comprising the steps of supporting an article to be trued, moving the article longitudinally into position to be trued, rotating the article, adjusting the cutter supporting means for controlling movement of the cutter along any one of a plurality of preselected paths which lie within the range which includes a relatively small radius convex cutting path to a flat cutting path across the article, moving the cutter transversely along said preselected path to cut the desired contour of the periphery of the article, centering the cutter supporting means and cutter transversely of the article prior to adjusting the path of movement of the cutter, and maintaining the cutter from longitudinal movement during adjustment of its path of movement within said range.

22. A method of truing an article with a cutter supported on transversely movable cutter supporting means comprising the steps of supporting an article to be trued, moving the article longitudinally into position to be trimmed by the cutter, rotating the article, adjusting the cutter supporting means for transversely moving the cutter along one of a plurality of preselected paths within the range which includes a relatively small radius convex cutting path through a flat cutting path to a concave cutting path across the article, moving the cutter transversely along said predetermined selected path to cut the desired contour on the article, centering the cutter supporting means and the cutter transversely of the article prior to adjusting the path of movement of the cutter, and maintaining the cutter from longitudinal movement during adjustment of its path of movement within said range.

23. An apparatus for trimming an article with a cutter comprising means for applying a transverse motion to the cutter across the article in a shallow convex path, and means for superimposing a pivoted motion of the cutter which retracts the cutter from the article on each side of the article midplane to flatten the convex path of the cutter to provide a flat cut across the article.

24. An apparatus according to claim 23 and additionally including means for rotating the article.

25. The method of trimming an article with a cutter comprising the steps of applying a translatory motion to the cutter across the article in a shallow convex path, and superimposing a pivoted motion of the cutter which retracts the cutter from the article on each side of the article midplane to flatten the convex translatory path of the cutter.

26. The method according to claim 25 and additionally including the step of rotating the article.

* * * * *